US006980275B1

(12) United States Patent
Konuma et al.

(10) Patent No.: US 6,980,275 B1
(45) Date of Patent: Dec. 27, 2005

(54) ELECTRO-OPTICAL DEVICE (75) Inventors: Toshimitsu Konuma, Kanagawa (JP); Takahiro Tsuji, Kanagawa (JP); Kouji Moriya, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 08/698,204

(22) Filed: Aug. 14, 1996

Related U.S. Application Data (63) Continuation of application No. 08/301,774, filed on Sep. 7, 1994, now abandoned.

(30) Foreign Application Priority Data

Sep. 20, 1993 (JP) .................................. 5-256571

(51) Int. Cl.⁷ .......................................... G02F 1/1339
(52) U.S. Cl. ...................................... 349/154; 349/151
(58) Field of Search ............................. 359/82, 83, 59; 349/149, 150, 151, 152, 153, 154

(56) References Cited

U.S. PATENT DOCUMENTS

| 3,600,061 | A |   | 8/1971  | Heilmeier et al. |
| 4,362,771 | A |   | 12/1982 | Umeda et al. |
| 4,394,067 | A | * | 7/1983  | Spruijt et al. ................. 359/88 |
| 4,600,273 | A | * | 7/1986  | Ohno ........................ 349/152 |
| 4,688,074 | A | * | 8/1987  | Iinuma ....................... 349/151 |
| 4,826,297 | A | * | 5/1989  | Kubo et al. ..................... 359/82 |
| 5,076,667 | A | * | 12/1991 | Stewart et al. ............... 349/151 |
| 5,130,832 | A | * | 7/1992  | Kawaguchi et al. .......... 359/87 |
| 5,130,833 | A |   | 7/1992  | Mase |
| 5,148,301 | A |   | 9/1992  | Sawatsubashi et al. |
| 5,200,847 | A | * | 4/1993  | Mawatari et al. ........... 349/151 |
| 5,247,375 | A |   | 9/1993  | Mochizuki et al. |
| 5,278,682 | A | * | 1/1994  | Niki ........................... 349/189 |
| 5,278,685 | A |   | 1/1994  | Iwamoto et al. |
| 5,311,342 | A | * | 5/1994  | Watanabe .................... 349/152 |
| 5,436,744 | A | * | 7/1995  | Arledge et al. ............... 359/82 |
| 5,442,470 | A | * | 8/1995  | Hashimoto .................... 359/83 |
| 5,460,983 | A |   | 10/1995 | Hodges et al. |
| 5,517,344 | A | * | 5/1996  | Hu et al. ..................... 349/153 |
| 5,548,428 | A | * | 8/1996  | Masaki et al. .............. 349/189 |
| 5,710,612 | A |   | 1/1998  | Mase |
| 6,023,075 | A |   | 2/2000  | Yamazaki |
| 6,236,444 | B1 |  | 5/2001  | Konuma et al. |

FOREIGN PATENT DOCUMENTS

| JP | 55-064212 | 5/1980 |
| JP | 56-111831 | 9/1981 |

(Continued)

OTHER PUBLICATIONS

IBM Technical Disclosure Bulletin, "Sealing Structure for L.C.D.", Oct. 1989.*

(Continued)

Primary Examiner—Kenneth Parker
(74) Attorney, Agent, or Firm—Eric J. Robinson; Robinson Intellectual Property Law Office, P.C.

(57) ABSTRACT

A highly reliable liquid crystal display device in which the drive circuit region is protected, which comprises a first substrate having thereon a display region and a drive circuit region comprising a drive circuit for controlling the display in said display region and a second substrate opposed to said first substrate, provided that said regions are partitioned by a sealing agent and that a liquid crystal material is incorporated between said first substrate and said second substrate opposed to the first one, wherein, said second substrate opposed to the first is extended to oppose both of said display region and said drive circuit region provided on the first substrate.

33 Claims, 6 Drawing Sheets

FOREIGN PATENT DOCUMENTS

| | | | | |
|---|---|---|---|---|
| JP | 61-056322 | * | 3/1986 | |
| JP | 62-109026 | | 5/1987 | |
| JP | 62-240934 | * | 10/1987 | ................. 349/152 |
| JP | 62-251723 | | 11/1987 | |
| JP | 1-049022 | | 2/1989 | |
| JP | 64-49022 | * | 2/1989 | |
| JP | 1-68725 | | 3/1989 | |
| JP | 03-029923 | | 2/1991 | |
| JP | 03-035528 | | 4/1991 | |
| JP | 03-246522 | * | 11/1991 | |
| JP | 04-034409 | * | 2/1992 | |
| JP | 4-042215 | * | 2/1992 | |
| JP | 4-78819 | * | 3/1992 | ................. 359/82 |
| JP | 04-083227 | | 3/1992 | |
| JP | 4-93925 | * | 3/1992 | |
| JP | 4-116623 | | 4/1992 | |
| JP | 4116623 | * | 4/1992 | ................. 359/82 |
| JP | 4-133029 | | 5/1992 | |
| JP | 4-260023 | | 9/1992 | |
| JP | 04-260023 | | 9/1992 | |
| JP | 04-120934 | | 10/1992 | |
| JP | 4-355433 | | 12/1992 | |
| JP | 05-005884 | * | 1/1993 | |
| JP | 05-061054 | | 3/1993 | |
| JP | 5-066413 | | 3/1993 | |
| JP | 05-188379 | * | 7/1993 | |
| JP | 5-203977 | | 8/1993 | |
| JP | 6-186580 | | 7/1994 | |
| JP | 07-092475 | | 4/1995 | |
| JP | 07-281141 | | 10/1995 | |
| JP | 08-271873 | | 10/1996 | |
| JP | 6-186579 | | 7/1999 | |

OTHER PUBLICATIONS

IBM technical Disclosure, vol. 32, #5a pp. 223-224, Oct. 1989.*

Panel Assembling Technique Scriber/Cell Breaking Device: JKL-454F, 93 *Latest Liquid Crystal Process Techniques, Semiconductor World*, Oct. 1, 1992, p. 272 (with English translation).

Mitsuru Ikezaki, Seminar Textbook, "Super High Definition Technique in LCD," pp. 1-6, Jul. 03, 2001.

Panel Assembling Technique Scriber/Cell Breaking Device: JKL-454F, 93 *Latest Liquid Crystal Process Techniques, Semiconductor World*, Oct. 1, 1992, p. 272 (with English translation).

English translation of Japanese Patent Office Communication, dated Nov. 16, 1999, 2 pages.

* cited by examiner

ELECTRO-OPTICAL DEVICE

This application is a Continuation of Ser. No. 08/301,774, filed Sep. 7, 1994, now abandoned.

BACKGROUND OF THE INVENTION

1. Industrial Field of the Invention

The present invention relates to a liquid crystal display device comprising both a display region and a drive circuit region for a drive circuit which controls the display formed on a single substrate. The liquid crystal display device according to the present invention comprises another substrate opposed to the portion of the drive circuit in order to prevent failure from occurring on the drive circuit due to external pressure or shock.

2. Prior Art

Conventionally known liquid crystal display devices include active matrix-addressed (active matrix) liquid crystal display device comprising active elements such as a thin film transistor (referred to simply hereinafter as a "TFT") on each of the pixels. Among them, there is also known an active matrix display device of a monolithic structure comprising drive circuits, which controls the signal applied to each of the pixels, provided integrated to the substrate having thereon the active elements connected to each of the pixels. The drive circuit is formed simultaneously with the fabrication of an amorphous silicon TFT for the display portion constituting the matrix, and then crystallized by selectively irradiating laser and the like to the drive circuit portion alone. In this manner, the TFTs in the drive circuit were converted into crystalline silicon TFTs.

Figure 1A:
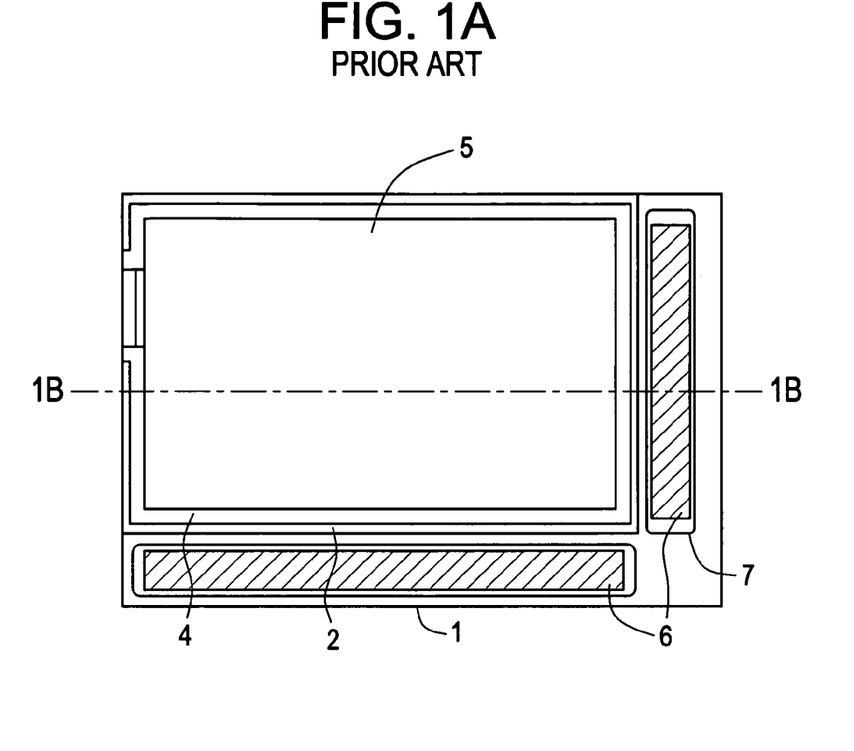
FIGS. 1(A) and 1(B) show a schematic view of a prior art liquid crystal display device.
Figure 1B:
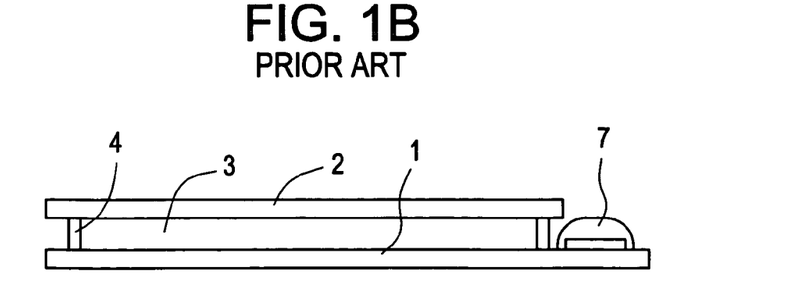

Referring to FIGS. 1A and 1B which schematically show a device of the type described above, it can be seen a substrate 2 opposing to a substrate 1 having thereon the drive circuit is extended to cover only a display region 5 comprising a liquid crystal material 3, and no measure is taken for the drive circuit portion 6 except for covering with a resin 7 or a like material.

However, in the construction of a liquid crystal display device of a conventional type, an external force toward the drive circuit portion may easily cause damage on the drive circuit.

SUMMARY OF THE INVENTION

In the light of the aforementioned circumstances, the present invention provides a highly reliable liquid crystal electro-optical display device comprising both a display region and a drive circuit region on a single substrate, in which the drive circuit region is protected against external forces and the like.

According to one embodiment of the present invention, there is provided a liquid crystal electro-optical display device comprising a first substrate having thereon a display region and a drive circuit region comprising a drive circuit for controlling the display in said display region and a second substrate opposed to said first substrate, provided that said regions are partitioned by a sealing agent and that a liquid crystal material is incorporated between said first substrate and said second substrate opposed to the first one, wherein, said second substrate opposed to the first is extended to oppose both of said display region and said drive circuit region provided on the first substrate.

According to another embodiment of the present invention, there is provided a liquid crystal electro-optical display device comprising a first substrate having thereon a display region and a drive circuit region comprising a drive circuit for controlling the display in said display region and a second substrate opposed to said first substrate, provided that said regions are partitioned by a sealing agent and that a liquid crystal material is incorporated between said first substrate and said second substrate opposed to the first one, wherein, said second substrate opposed to the first is extended to oppose both of said display region and said drive circuit region provided on the first substrate, and at least a part of the periphery of said drive circuit region has thereon a sealing agent.

According to a still other embodiment of the present invention, there is provided a liquid crystal electro-optical display device comprising a first substrate having thereon a display region and a drive circuit region comprising a drive circuit for controlling the display in said display region and a second substrate opposed to said first substrate, provided that said regions are partitioned by a sealing agent and that a liquid crystal material is incorporated between said first substrate and said second substrate opposed to the first one, wherein, said second substrate opposed to the first is extended to oppose both of said display region and said drive circuit region provided on the first substrate, and a resin material is charged at least between said second substrate and said drive circuit region.

According to a yet other embodiment of the present invention, there is provided a liquid crystal electro-optical display device comprising a first substrate having thereon a display region and a drive circuit region comprising a drive circuit for controlling the display in said display region and a second substrate opposed to said first substrate, provided that said regions are partitioned by a sealing agent and that a liquid crystal material is incorporated between said first substrate and said second substrate opposed to the first one, wherein, said second substrate opposed to the first is extended to oppose both of said display region and said drive circuit region provided on the first substrate, at least a part of the periphery of said drive circuit region has thereon a sealing agent, and a resin material is charged at least between said second substrate and said drive circuit region.

According to further other embodiments of the present invention, there are provided liquid crystal display devices having the constitution enumerated above, wherein, a drive circuit is formed on the second substrate at a region opposed to the drive circuit region.

DETAILED DESCRIPTION OF THE PRESENT INVENTION

As described in the foregoing, the present invention provides a liquid crystal display device comprising both a display region and a drive circuit region for a drive circuit which controls the display on a single substrate, provided that a substrate is opposed to the portion of the drive circuit in order to protect the drive circuit from external pressure and shock.

Furthermore, a resin material is charged between at least the drive circuit region and the substrate opposed thereto, thereby preventing the intrusion of moisture and the like. In this manner, a liquid crystal display device with further improved reliability can be realized.

Another drive circuit and the like can be further provided on the region of the second substrate opposed to the drive circuit region. In this manner, a multilayer-structured device having a large drive circuit region can be implemented without increasing the substrate area.

The present invention is described in further detail below referring to the preferred embodiments according to the present invention. It should be understood, however, that the present invention is not to be construed as being limited to the examples below.

EXAMPLE 1

Figure 2A:
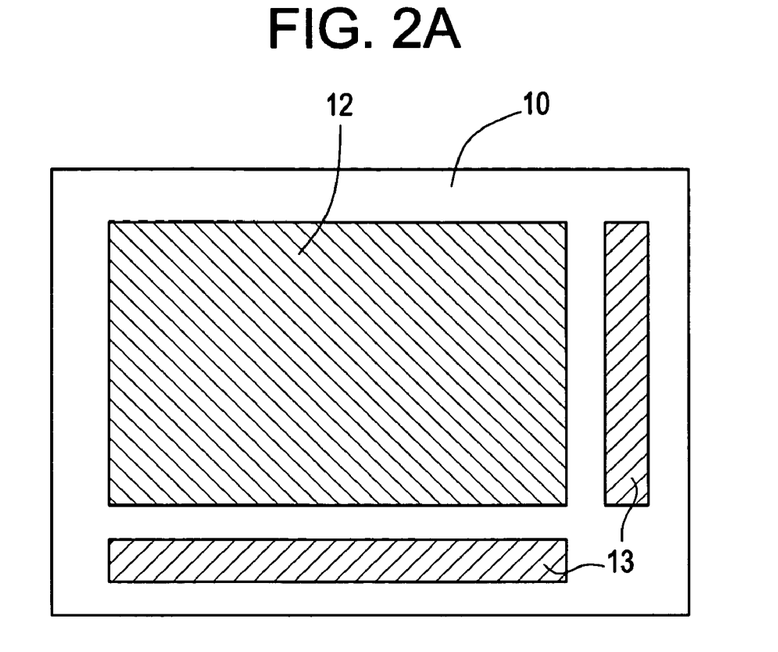
FIGS. 2(A) and 2(B) show a schematic view of a liquid crystal display device according to an embodiment of the present invention.

Referring to FIG. 2(A), an amorphous silicon TFT was fabricated on a display region 12 of a Corning 7059 glass substrate 10. A crystalline silicon TFT was fabricated on a drive circuit region 13 by irradiating a laser beam to an amorphous silicon TFT for its crystallization. If necessary, the crystalline silicon TFT is covered with a passivation film made of, for example, SiN, $SiO_2$, PSG (phosphosilicate glass), BSG (borosilicate glass), or polyimide to construct a drive circuit. A pixel electrode and the like were formed thereafter on the display region 12 to implement a 640×480-matrix.

Figure 2B:
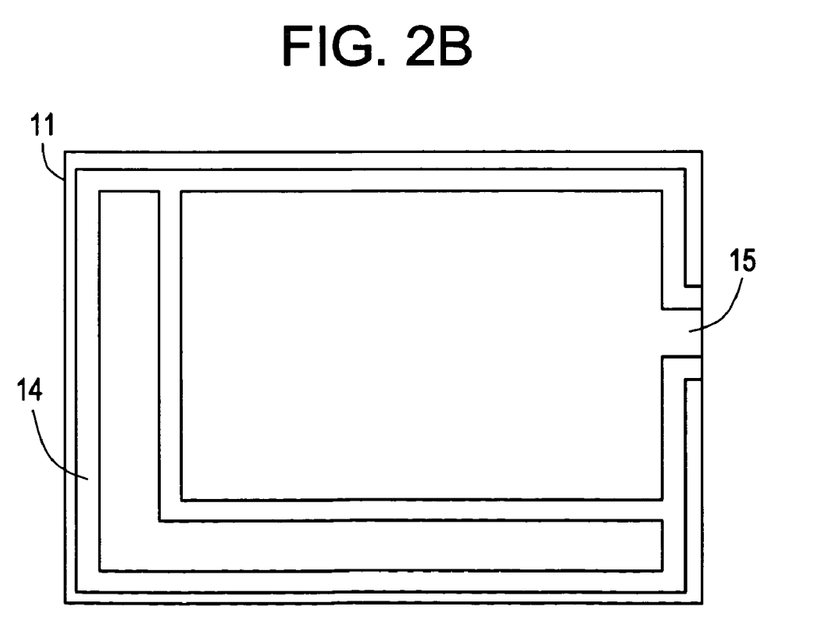

A sealing agent 14, more specifically, an ultraviolet-curable (referred to simply hereinafter as "UV-curable") resin in this case, was applied to a second substrate to be opposed to the first substrate above. This second substrate is capable of covering the drive circuit region of the facing first substrate, and comprises an ITO (indium tin oxide) facing electrode either on the display region alone or on the entire surface thereof. Referring to FIG. 2(B), the sealing agent 14 was applied by screen printing in such a manner that each of the display region 12 and the drive circuit region 13 may be surrounded separately. An inlet 15 for injecting the liquid crystal material must be formed to the sealing agent provided for covering the display region. The entire periphery of drive circuit region need not be surrounded by the sealing agent. Otherwise, the display region alone can be surrounded by the sealing agent while leaving the drive circuit region uncovered by the sealing agent. Furthermore, the sealing agent may contain spacers.

Thus, the first substrate 10 and the second substrate 11 opposed to the first substrate were laminated after scattering spacers on the display region of the substrate 10, and an ultraviolet radiation was irradiated thereto for curing.

A liquid crystal material 16 was injected into inside of the display region after reducing the pressure of the laminated substrates, and sealed.

Figure 3A:
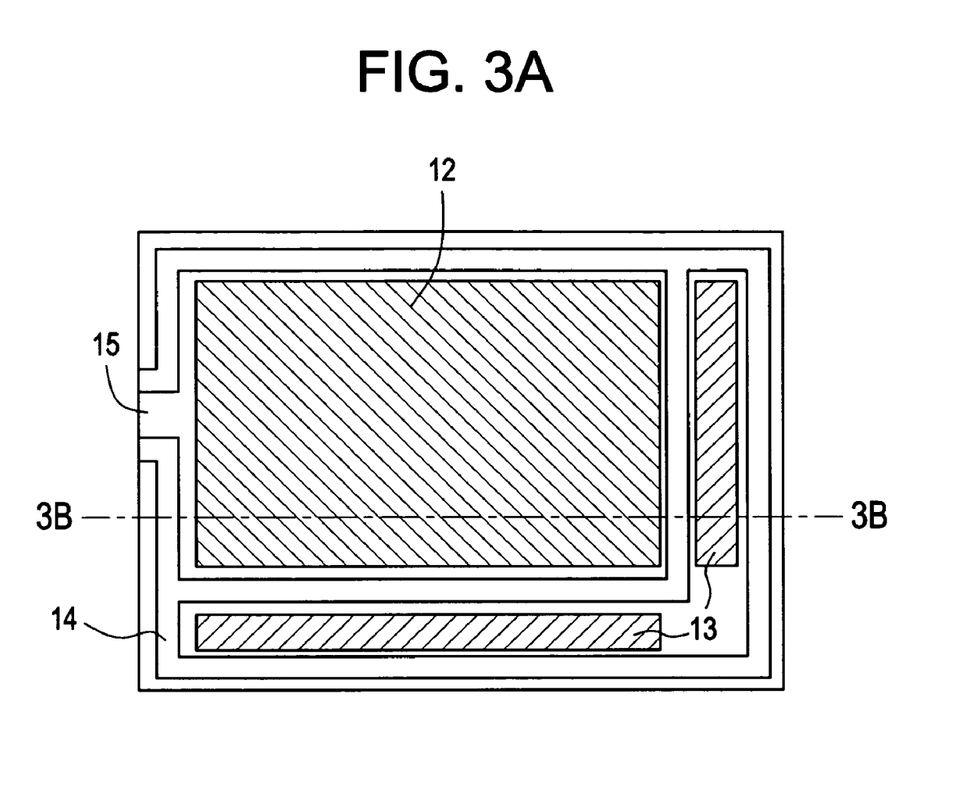
FIGS. 3(A) and 3(B) show a schematic view of a liquid crystal display device according to another embodiment of the present invention.
Figure 3B:
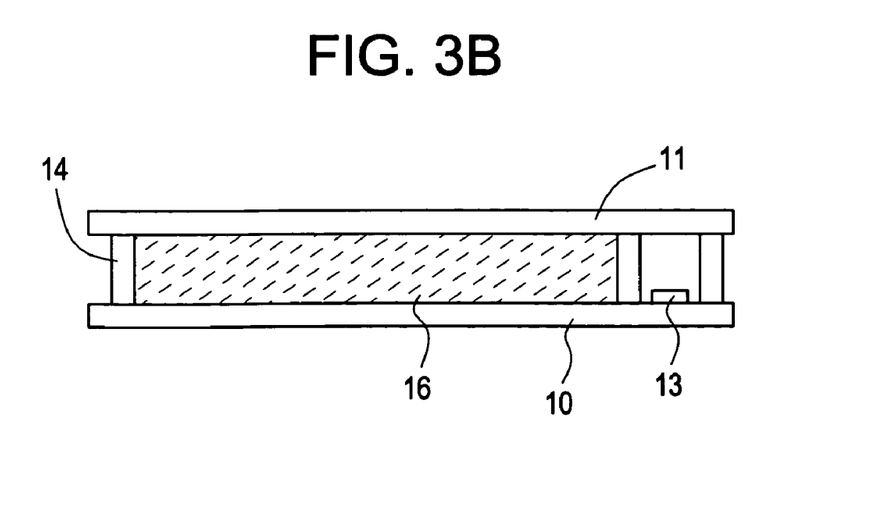

FIGS. 3(A) and 3(B) illustrate a liquid crystal display device formed in such manner described above. The liquid crystal display device according to the present embodiment of the present invention was found to have far improved strength against external pressure as compared to a prior art device comprising both the display region and the drive circuit region on a single substrate but having its drive circuit covered by a resin and the like instead of providing a glass substrate opposed thereto. Thus, the drive circuit of the liquid crystal display device according to the present invention was found sufficiently protected against external force and therefore free from breakage. Moreover, the liquid crystal display device according to the present invention can be fabricated by an extremely simple process.

EXAMPLE 2

Figure 4A:
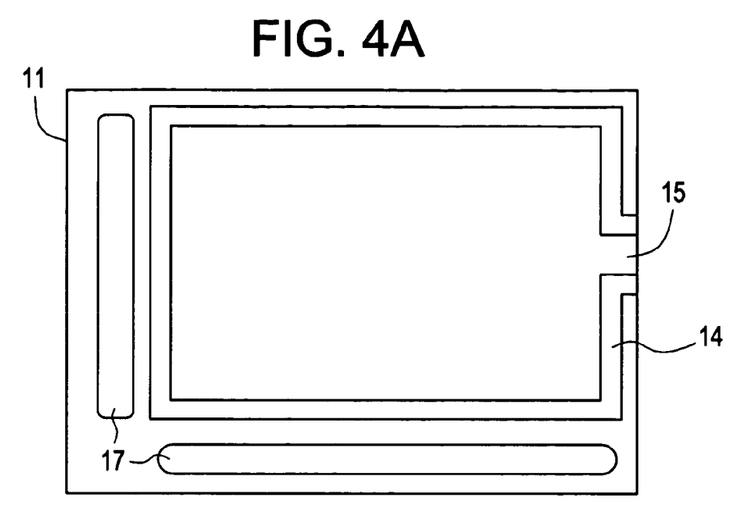
FIGS. 4(A), 4(B) and 4(C) show a schematic view of a liquid crystal display device according to a still other embodiment of the present invention.

Referring to FIG. 4(A), a first substrate 10 having thereon a display region and a drive circuit region as well as a second substrate 11 having thereon a facing electrode were fabricated in the same manner as in Example 1. Then, a sealing agent 14, more specifically, a UV-curable resin in this case, was applied by screen printing to the second substrate 11 to cover the display region 12. The sealing agent may contain spacers. An inlet 15 for injecting a liquid crystal material must be provided in this step.

A resin material 17, such as a UV-curable resin or an epoxy resin, is provided to the portion to be opposed to the drive circuit region 13 by either screen printing or potting, so that the resin material can be charged sufficiently on at least the drive circuit region upon laminating the first substrate 10 and the second substrate 11 opposed thereto. The resin material may be the same as that for the sealing agent. The sealing agent and the resin may be applied not on the second substrate side, but on the first substrate side having thereon the display region and the drive circuit region.

After scattering spacers on the display region of the first substrate 10, the first substrate 10 was laminated with the second substrate 11. The sealing agent and the resin on the drive circuit region were cured thereafter.

The thus laminated substrates were placed under vacuum, and a liquid crystal material 16 was injected inside the display region and sealed.

Figure 4B:
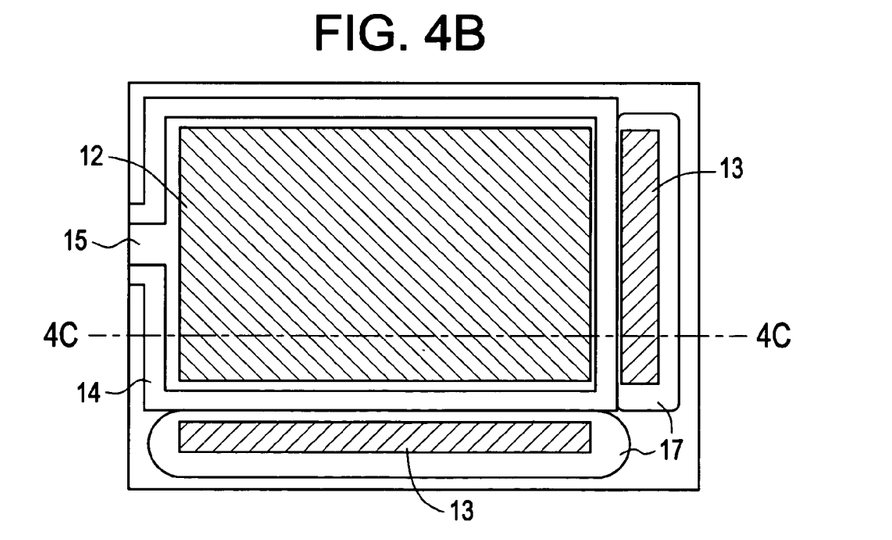
Figure 4C:
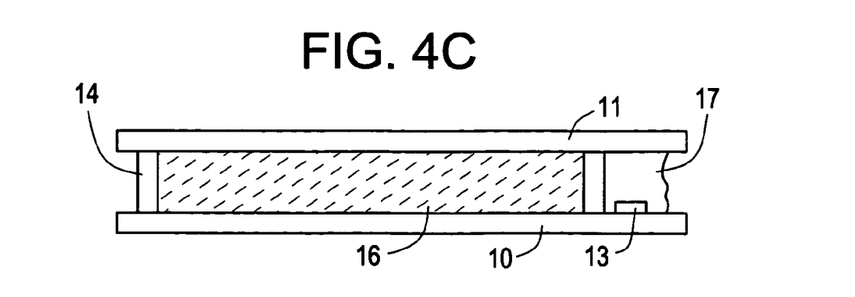

Thus was implemented a liquid crystal display device as illustrated in FIG. 4(B). Similar to the case in Example 1, the drive circuit in this liquid crystal display device was again found protected against external force, and the device itself had excellent resistance against intrusion of moisture. Accordingly, a highly reliable liquid crystal display device was implemented by a process according to an embodiment of the present invention.

EXAMPLE 3

Figure 5A:
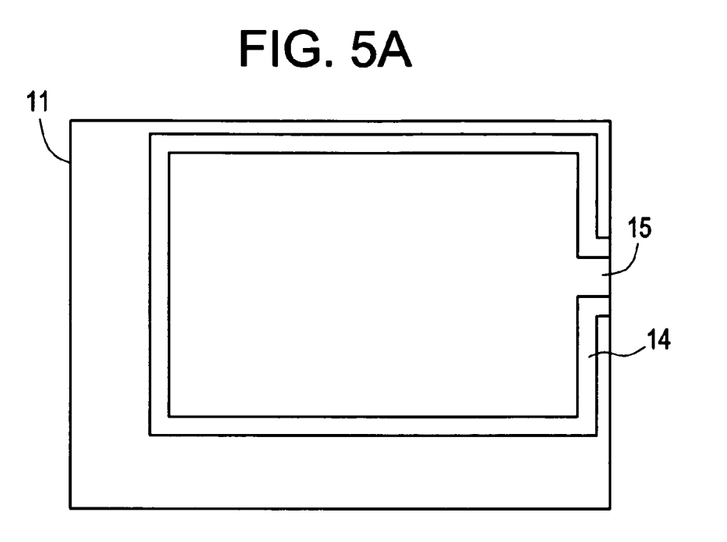
FIGS. 5(A), 5(B) and 5(C) show a schematic view of a liquid crystal display device according to a yet other embodiment of the present invention.

Referring to FIG. 5(A), a first substrate 10 having thereon a display region and a drive circuit region as well as a second substrate 11 having thereon a facing electrode were fabricated in the same manner as in Example 1. Then, a sealing agent 14, more specifically, a UV-curable resin in this case, was applied by screen printing to the second substrate 11 to cover the display region 12. The sealing agent may contain spacers. An inlet 15 for injecting a liquid crystal material must be provided in this step.

After scattering spacers on the display region of the first substrate 10, the first substrate 10 was laminated with the second substrate 11. The sealing agent was cured thereafter.

The thus laminated substrates were placed under vacuum, and a liquid crystal material 16 was injected inside the display region and sealed.

Then, a resin material (a UV-curable resin in this case) was charged in the portion between the substrates under a reduced pressure of from about 0.01 to 10 Torr, and the entire structure was placed under normal pressure or under a pressurized state. The resin material was found to intrude into the periphery of the sealing agent, and the space between the substrates corresponding to the drive circuit region 13 was charged with a resin material 17. The resin was cured thereafter by irradiating an ultraviolet radiation.

In case two substrates of the same size are used, the resin can be mounted on both sides of the substrates. This further facilitates the fabrication process. The liquid crystal material can be injected after charging and curing the resin.

Figure 5B:
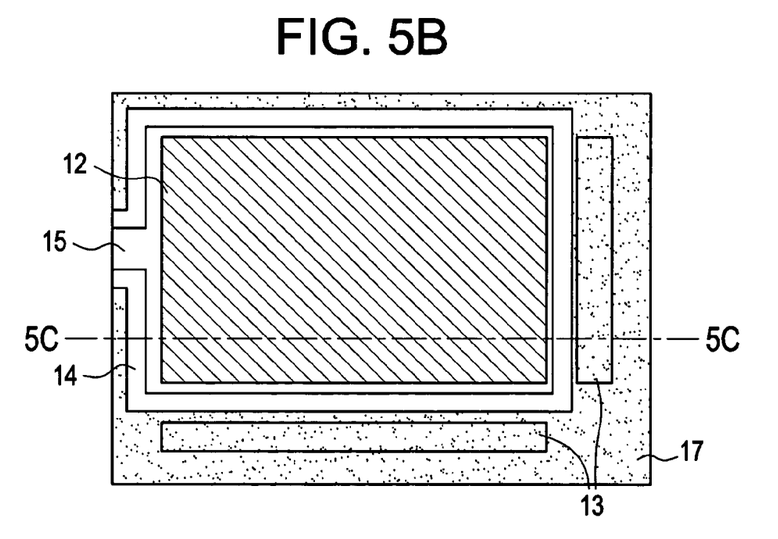
Figure 5C:
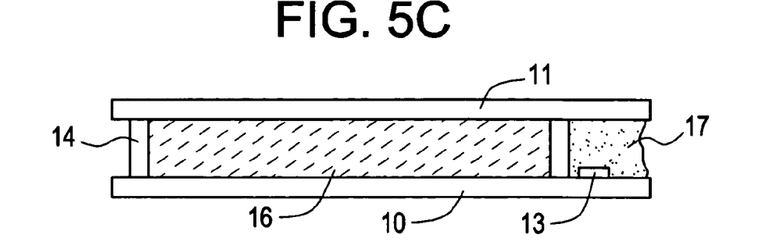

Similar to Example 2, thus was implemented a highly reliable liquid crystal display device having sufficiently high resistance against moisture. The resulting device is illustrated in FIG. 5(B).

EXAMPLE 4

Figure 6A:
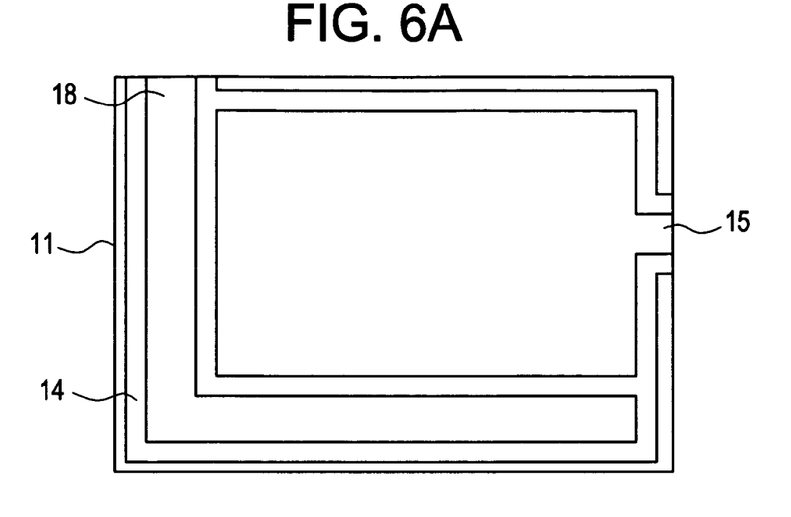
FIGS. 6(A), 6(B) and 6(C) show a schematic view of a liquid crystal display device according to a further other embodiment of the present invention.

Referring to FIG. 6(A), a first substrate 10 having thereon a display region and a drive circuit region as well as a second substrate 11 having thereon a facing electrode were fabricated in the same manner as in Example 1. Then, a sealing agent 14, more specifically, a UV-curable resin in this case, was applied by screen printing to the second substrate 11 to form an inlet 15 for injecting a liquid crystal material and an inlet 18 for injecting a resin. The sealing agent may contain spacers.

After scattering spacers on the display region of the first substrate 10, the first substrate 10 was laminated with the second substrate 11. The sealing agent was cured thereafter.

The entire laminated substrates were placed under a reduced pressure of from about 0.01 to 10 Torr, and a liquid crystal material 16 and a resin material 17 (a UV-curable resin in this case) were injected from the inlets 15 and 18, respectively. In this manner, the display region and the region surrounding the drive circuit can be charged with the liquid crystal material 16 and the resin material 17, respectively. The injection can be effected simultaneously; otherwise, it can be effected separately to prevent mixing of the resin material and the liquid crystal from occurring due to evaporation during the injection.

The resulting structure was then placed under a normal pressure or a pressurized state. The resin material 17 was found to intrude into the region covered by the sealing agent to fill the space between the substrates corresponding to the drive circuit region. An ultraviolet radiation was irradiated thereafter to cure the resin.

Figure 6B:
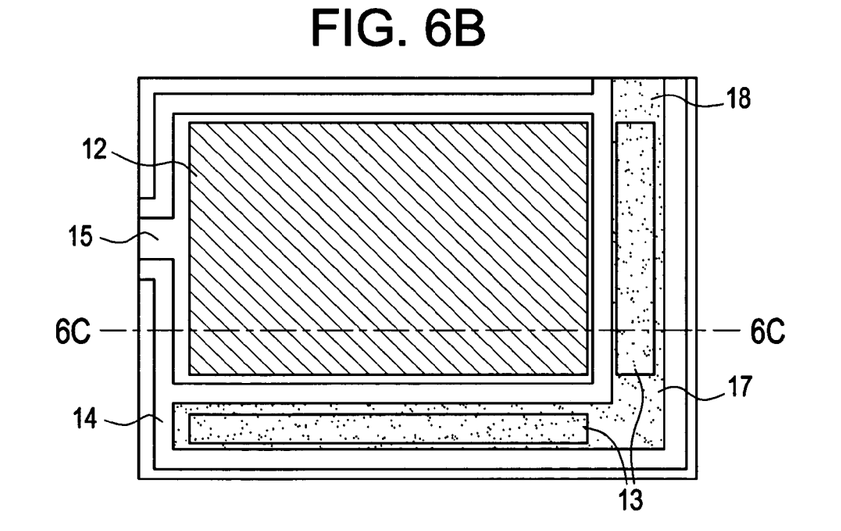
Figure 6C:
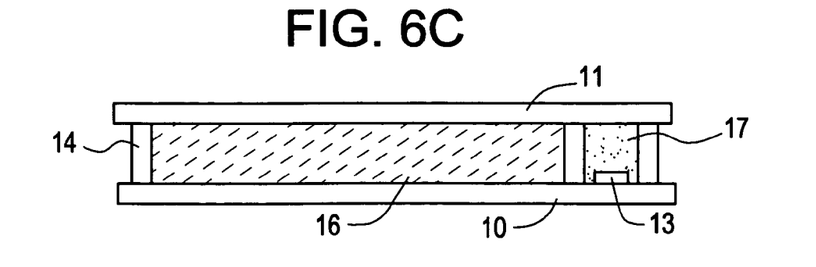

Similar to Examples 2 and 3, thus was implemented by an extremely simple process, a highly reliable liquid crystal display device having sufficiently high resistance against moisture. The resulting device is illustrated in FIG. 6(B).

In the aforementioned embodiments, the drive circuit need not to be provided on only one substrate, but it may be fabricated on both of the substrates. The electrical connection between the drive circuits in such a case can be established by using, for example, a silver paste or an electrically conductive spacer. The liquid crystal material may be of any type, inclusive of nematic and smectic liquid crystal materials. In the attached drawings, the first and the second substrates 10 and 11 are drawn in the same size. However, the size of the substrates can be changed as desired as long as a substrate is opposed to the drive circuit provided on the other substrate. Electrodes can be more easily connected by increasing the size of the substrate 10.

In the examples above, special reference was made to active matrix-addressed devices using thin film transistors for the display region. However, the present invention is also applicable to device using non-linear devices such as MIM diodes as well as to simple matrix-addressed devices using simple matrix electrodes.

As described in the foregoing, the present invention provides a liquid crystal display device comprising both a display region and a drive circuit region on a single substrate, in which the drive circuit region is protected against external forces and the like. Furthermore, in case of chamfering a plurality of liquid crystal display panels from a large area substrate by applying a scriber to the laminated substrates, the drive circuit could be protected against the impact and the like which is caused by the operation of a scriber. Thus, the present invention enables production of liquid crystal display panels with high production yield.

Furthermore, in the liquid crystal display device according to the present invention, a resin material was charged between the drive circuit region and the substrate opposed thereto. In this manner, a highly reliable device was implemented by preventing the intrusion of moisture.

In the liquid crystal display device according to the present invention, another drive circuit and the like can be further provided on the region of the second substrate opposed to the drive circuit region. In this manner, a multilayer-structured device having a large drive circuit area can be implemented without increasing the substrate area.

While the invention has been described in detail and with reference to specific embodiments thereof, it will be apparent to one skilled in the art that various changes and modifications can be made therein without departing from the spirit and scope thereof.

What is claimed is:

1. An active matrix type display device comprising:
   a first substrate;
   an active matrix circuit having a plurality of pixels arranged in a matrix form over said first substrate;
   at least one driver circuit for driving said active matrix circuit over said first substrate, there being at least one side of said first substrate at which no driver circuit is disposed, and each of said active matrix circuit and said driver circuit comprising thin film transistors provided over said first substrate;
   a second substrate opposed to said first substrate;
   a liquid crystal provided between said first substrate and said second substrate;
   a resin material provided between said first and second substrates, said resin material covering said driver circuit;
   a sealing agent provided between said first substrate and said second substrate for sealing said liquid crystal therebetween, said sealing agent enclosing said active matrix circuit and said driver circuit;
   an inlet for injecting said liquid crystal between said first substrate and said second substrate,
   wherein said inlet is provided to said sealing agent and on a side edge of said first substrate and said second substrate corresponding to said one side of said first substrate.

2. The device of claim 1 wherein the thin film transistors of each of said active matrix circuit and said driver circuit are formed over said first substrate through a common process.

3. The device of claim 1 wherein said sealing agent overlaps at least a part of said driver circuit.

4. The device of claim 1 wherein a same material as said sealing agent is provided over at least said driver circuit.

5. The device of claim 1 wherein said sealing agent comprises an ultraviolet-curable resin.

6. The device of claim 1 wherein said second substrate has at least one side edge which is substantially aligned with a side edge of said first substrate.

7. An active matrix type display device comprising:
a first substrate;
an active matrix circuit having a plurality of pixels arranged in a matrix form over said first substrate;
at least one driver circuit for driving said active matrix circuit over said first substrate, there being at least one side of said first substrate at which no driver circuit is disposed, and each of said active matrix circuit and said driver circuit comprising thin film transistors provided over said first substrate;
a second substrate opposed to said first substrate wherein an electrical element is provided over the second substrate at least at a region opposed to the driver circuit;
a liquid crystal provided between said first substrate and said second substrate;
a resin material provided between said first and second substrates, said resin material covering said driver circuit;
a sealing agent provided between said first substrate and said second substrate for sealing said liquid crystal therebetween, said sealing agent enclosing said active matrix circuit and said driver circuit; and
an inlet for injecting said liquid crystal between said first substrate and said second substrate,
wherein said inlet is provided to said sealing agent and on a side edge of said first substrate and said second substrate corresponding to said one side of said first substrate,
wherein said second substrate has at least one side edge which is substantially aligned with a side edge of said first substrate and an outer edge of said sealing agent, and
wherein an electrical connection is established between said driver circuit and said electrical element by at least one silver paste or at least one electrically conductive spacer.

8. The device of claim 7 wherein said thin film transistor of each of said active matrix elements and said driver circuit is formed through a common process.

9. The device of claim 7 wherein said sealing agent overlaps at least a part of said driver circuit.

10. The device of claim 7 wherein a same material as said sealing agent is provided over at least said driver circuit.

11. The device of claim 7 wherein said sealing agent comprises an ultraviolet-curable resin.

12. An active matrix type display device comprising:
a first substrate;
an active matrix circuit having a plurality of pixels arranged in a matrix form over said first substrate;
at least one driver circuit for driving said active matrix circuit over said first substrate, there being at least one side of said first substrate at which no driver circuit is disposed, and each of said active matrix circuit and said driver circuit comprising thin film transistors provided over said first substrate;
a second substrate opposed to said first substrate;
a liquid crystal provided between said first substrate and said second substrate;
a resin material provided between said first and second substrates, said resin material covering said driver circuit;
a sealing agent provided between said first substrate and said second substrate and enclosing said active matrix circuit and said driver circuit; and
an inlet for injecting said liquid crystal between said first substrate and said second substrate,
wherein said inlet is provided to said sealing agent and on a side edge of said first substrate and said second substrate corresponding to said one side of said first substrate.

13. The device of claim 12 wherein said active matrix circuit comprises an amorphous silicon transistor, and said driver circuit comprises a crystalline silicon transistor.

14. The device of claim 12 wherein said active matrix circuit comprises a MIM diode.

15. The device of claim 12 wherein said resin material comprises a material selected from the group consisting of an epoxy resin and an ultraviolet hardening resin.

16. The device of claim 12 wherein said sealing agent contains spacers.

17. An active matrix type display device comprising:
a first substrate;
an active matrix circuit having a plurality of pixels arranged in a matrix form over said first substrate;
at least one driver circuit for driving said active matrix circuit over said first substrate, there being at least one side of said first substrate at which no driver circuit is disposed, and each of said active matrix circuit and said driver circuit comprising thin film transistors provided over said first substrate;
a second substrate opposed to said first substrate wherein an electrical element is provided over the second substrate at least at a region opposed to the driver circuit;
a liquid crystal provided between said first substrate and said second substrate;
a resin material provided between said first and second substrates, said resin material covering said driver circuit;
a sealing agent provided between said first substrate and said second substrate and enclosing said active matrix circuit and said driver circuit;
a first inlet provided for introducing said liquid crystal between said first substrate and said second substrate; and
a second inlet provided for introducing said resin material between said first substrate and said second substrate,
wherein said first inlet is provided to said sealing agent and on a side edge of said first substrate and said second substrate corresponding to said one side of said first substrate, and
wherein an electrical connection is established between said driver circuit and said electrical element by at least one silver paste or at least one electrically conductive spacer.

18. The device of claim 17 wherein said sealing agent contains spacers.

19. An active matrix type display device comprising:
a first substrate;
an active matrix circuit having a plurality of pixels arranged in a matrix form over said first substrate;
at least one first driver circuit for driving said active matrix circuit over said first substrate, there being at least one side of said first substrate at which no first driver circuit is disposed, and each of said active matrix circuit and said first driver circuit comprising thin film transistors provided over said first substrate;

a second substrate opposed to said first substrate wherein a second driver circuit is provided over the second substrate at a region opposed to the first driver circuit;

a liquid crystal provided between said first substrate and said second substrate;

a resin material provided between said first and second substrates, said resin material covering said driver circuit;

a sealing agent provided between said first substrate and said second substrate for sealing said liquid crystal therebetween, said sealing agent enclosing said active matrix circuit and said first driver circuit;

an inlet for injecting said liquid crystal between said first substrate and said second substrate, wherein said inlet is provided to said sealing agent and on a side edge of said first substrate and said second substrate corresponding to said one side of said first substrate.

20. The device of claim 19 wherein the thin film transistors of each of said active matrix circuit and said first driver circuit are formed over said first substrate through a common process.

21. The device of claim 19 wherein said sealing agent overlaps at least a part of said first driver circuit.

22. The device of claim 19 wherein a same material as said sealing agent is provided over at least said first driver circuit.

23. The device of claim 19 wherein said sealing agent comprises an ultraviolet-curable resin.

24. An active matrix type display device comprising:
a first substrate;
an active matrix circuit having a plurality of pixels arranged in a matrix form over said first substrate;
at least one driver circuit for driving said active matrix circuit over said first substrate, there being at least one side of said first substrate at which no driver circuit is disposed, and each of said active matrix circuit and said driver circuit comprising thin film transistors provided over said first substrate;
a second substrate opposed to said first substrate;
a liquid crystal provided between said first substrate and said second substrate;
a resin material provided between said first and second substrates, said resin material covering said driver circuit;
a sealing agent provided between said first substrate and said second substrate for sealing said liquid crystal therebetween, said sealing agent enclosing said driver circuit;
an inlet for injecting said liquid crystal between said first substrate and said second substrate,
wherein said inlet is provided to said sealing agent and on a side edge of said first substrate and said second substrate corresponding to said one side of said first substrate.

25. The device of claim 24 wherein the thin film transistors of each of said active matrix circuit and said driver circuit are formed over said first substrate through a common process.

26. The device of claim 24 wherein said sealing agent contains spacers.

27. The device of claim 24 wherein said sealing agent comprises an ultraviolet-curable resin.

28. The device of claim 24 wherein said second substrate has at least one side edge which is substantially aligned with a side edge of said first substrate.

29. An active matrix type display device comprising:
a first substrate;
an active matrix circuit having a plurality of pixels arranged in a matrix form over said first substrate;
at least one driver circuit for driving said active matrix circuit over said first substrate, there being at least one side of said first substrate at which no driver circuit is disposed, and each of said active matrix circuit and said driver circuit comprising thin film transistors provided over said first substrate;
a second substrate opposed to said first substrate;
a liquid crystal provided between said first substrate and said second substrate;
a resin material provided between said first and second substrates, said resin material covering said driver circuit;
a sealing agent provided between said first substrate and said second substrate and enclosing said driver circuit; and
an inlet for injecting said liquid crystal between said first substrate and said second substrate,
wherein said inlet is provided to said sealing agent and on a side edge of said first substrate and said second substrate corresponding to said one side of said first substrate.

30. The device of claim 29 wherein the thin film transistors of each of said active matrix circuit and said driver circuit are formed over said first substrate through a common process.

31. The device of claim 29 wherein said sealing agent contains spacers.

32. The device of claim 29 wherein said sealing agent comprises an ultraviolet-curable resin.

33. The device of claim 29 wherein said second substrate has at least one side edge which is substantially aligned with a side edge of said first substrate.

* * * * *